UNITED STATES PATENT OFFICE.

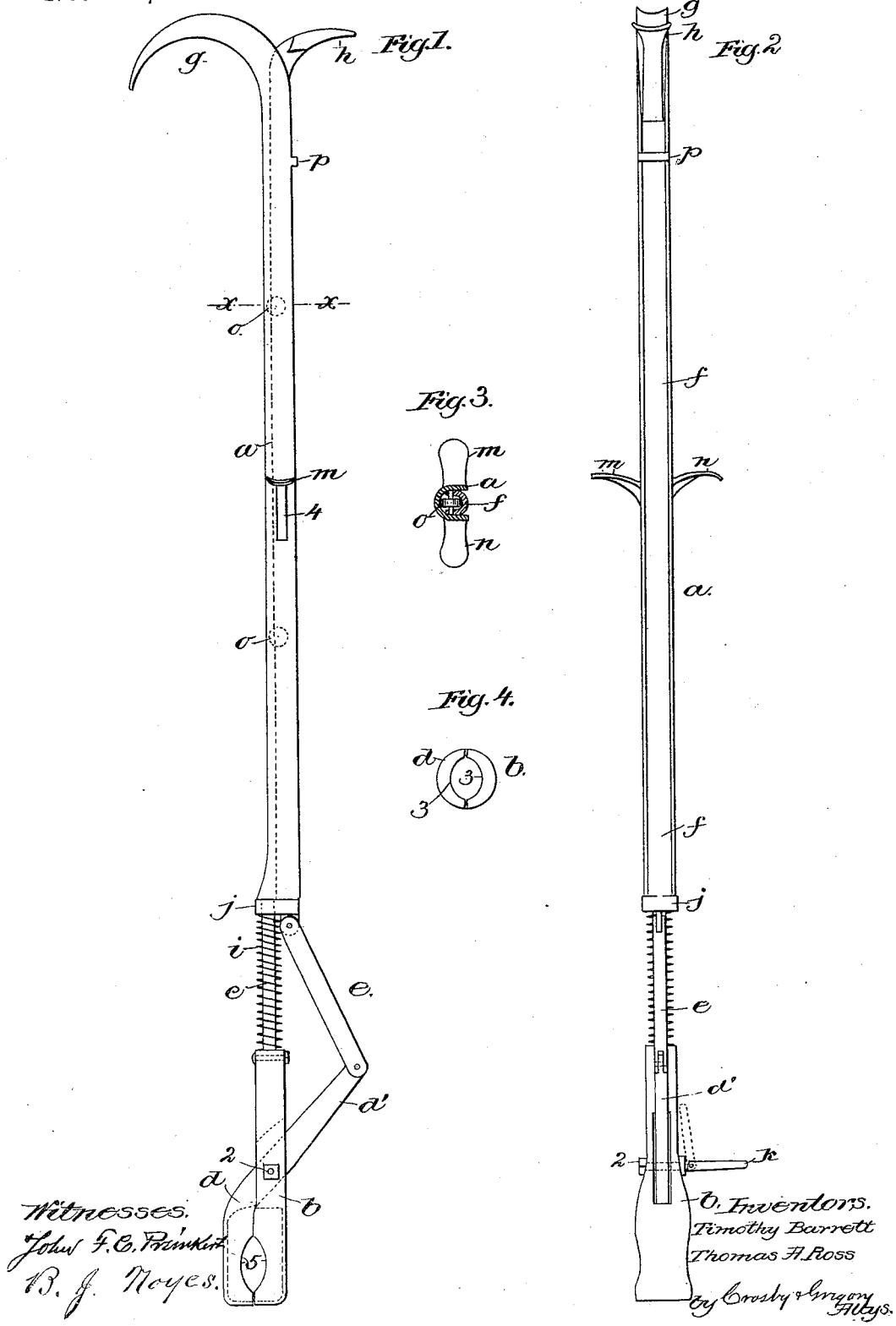

TIMOTHY BARRETT AND THOMAS A. ROSS, OF BOSTON, MASSACHUSETTS.

CAR-COUPLING TOOL.

SPECIFICATION forming part of Letters Patent No. 262,346, dated August 8, 1882.

Application filed March 27, 1882. (No model.)

*To all whom it may concern:*

Be it known that we, TIMOTHY BARRETT and THOMAS A. ROSS, of Boston, county of Suffolk, State of Massachusetts, have invented an Improvement in Implements for Coupling Cars, of which the following description, in connection with the accompanying drawings, is a specification.

This invention relates to an apparatus for coupling cars, and has for its object to produce a convenient portable implement by which the link may be directed into the draw-head when the cars approach, or a pin removed to uncouple the cars by the operator when standing on the ground at the side of the car or when upon the top of the car without necessitating entering between the cars that are being coupled.

The implement consists essentially of a bar having at its end a fixed jaw and a corresponding pivoted jaw arranged to take hold of a coupling-pin when at right angles to the said bar or in line therewith, according as it is to be operated from the side or top of the car. The said movable jaw is operated by a slide-bar mounted upon the main bar, and provided with suitable handles by which it may be operated to open the jaws, which are automatically closed by the action of a spring, except when positively acted upon by the operator. The main bar is U-shaped in cross-section to give it great stiffness in proportion to the weight, and the slide-bar for operating the movable jaw is also made U-shaped and of sufficient size to fit within the channel of the main bar. Suitable rollers are provided to enable the slide-rod to move more readily in relation to the fixed bar.

Figure 1 is a side view of a car-coupling implement constructed in accordance with this invention; Fig. 2, a view thereof seen at right angles to Fig. 1; Fig. 3, a transverse section on line $x\ x$, Fig. 1; Fig. 4, an end view of the jaws.

The coupling device consists essentially of a shaft or bar, $a$, U-shaped in cross-section, as shown in Fig. 3, to give it great stiffness, provided at one end with a jaw, $b$, rigidly connected therewith by a rod, $c$. A movable jaw, $d$, is pivoted to the said fixed jaw $b$ at 2, and has its shank $d'$ connected by a link, $e$, to the slide bar $f$, fitted within the main bar $a$, as shown in Fig. 3, it also being U-shaped in cross-section, as shown. The main bar $a$ is curved at the end opposite to the jaw $b$, as shown at $g$, to afford a suitable handle to sustain the implement in a vertical position, as when being operated from the top of the car, and the slide-bar $f$ is also provided with a handle, $h$, by which it can be pressed down to separate the jaw $d$ from the jaw $b$ to enable a coupling-pin to be grasped therein when the pressure is removed from the handle $h$. The spring $i$ upon the rod $c$ forces the slide-rod $h$ toward its normal position and closes the jaw $d$ upon the jaw $b$ or upon the pin inserted between them, the said jaws having curved holding portions at their ends, as shown at 3, Fig. 4, to enable a coupling-pin to be grasped when in line with the said implement. The spring $i$ acts upon the lug $j$, connected with the slide-bar $f$, the said lug running upon the rod $c$ as a guide for the slide-bar $f$ in its movement. The pivot 2, upon which the jaw $d$ turns, is provided with a hinged extension, $k$, (see Fig. 2,) which may be turned at right angles to the main portion of the coupling implement, as there shown, and serves to support a link and guide it into the draw-head as the cars come together.

For operating at the side of the car the handle portion $g\ h$ of the implement is placed behind the elbow of the operator, his forearm being extended along the shank or bar $a$ to support the implement, and the slide-bar $f$ is operated by a handle or thumb-pieces, $m$, connected therewith and working in a slot, 4, in the side of the bar $a$, which is provided on its opposite side with a rigid projection, $n$, which serves as a brace for the hands of the operator when manipulating the handle $m$. The slide-bar $f$ is provided with friction-rollers $o$, as shown in Fig. 3, which run on the main bar $a$ and render the movement of the said slide-bar easier. The slide-bar $f$ is retained in place in the bar $a$ by a cross-piece, $p$, near the handle end of the lug $j$, near the jaws.

The jaws $b\ d$ have holding portions 5 at their sides, which serve to grasp a pin when the implement is in the horizontal position, being operated from the ground at the side of the car, and in this case any portion of the said implement near the jaws may be employed to lift and guide the link into the draw-head when the cars come together.

We claim—

1. In an implement for coupling cars, the main bar or shank and pin-grasping jaws, provided with holding portions both at their ends and sides, combined with means to operate the said jaws both at the opposite end of and at an intermediate point on the said main bar, substantially as described.

2. In a car-coupling implement, the main shank-pin-holding jaws and means to operate the said jaws from the end of the said shank, combined with the lateral link-raising projection, whereby the operator at the top of the car is enabled to guide a link into the draw-head or to raise a pin, substantially as described.

3. The main bar, U-shaped in cross-section, and jaw fixed at the end thereof, combined with the pivoted jaw and its operating slide-bar, U-shaped in cross-section and mounted in the channel of the said main bar, substantially as described.

4. The main bar, U-shaped in cross-section, and the pin-holding jaws, combined with the jaw-operating slide-bar, U-shaped in cross-section, mounted in the channel of the said main bar and provided with friction-rollers, substantially as described.

5. The main bar, provided with handle or holding-projection at the end thereof, and another at an intermediate point in its length, and the jaw fixed at the end of the said bar, combined with the pivoted jaw and its operating slide-bar, provided with two handles cooperating with the said holding-projections of the fixed bar, the link connecting the said jaw and slide-bar, and the actuating-spring for the said slide-bar, whereby the said jaws are automatically closed, substantially as described.

In testimony whereof we have signed our names to this specification in the presence of two subscribing witnesses.

TIMOTHY BARRETT.
THOMAS A. ROSS.

Witnesses:
  JOS. P. LIVERMORE,
  B. J. NOYES.